July 19, 1927.
W. B. ENGLER
1,636,555
HOISTING DEVICE FOR VEHICLE BODIES
Filed Feb. 26, 1927  3 Sheets-Sheet 1
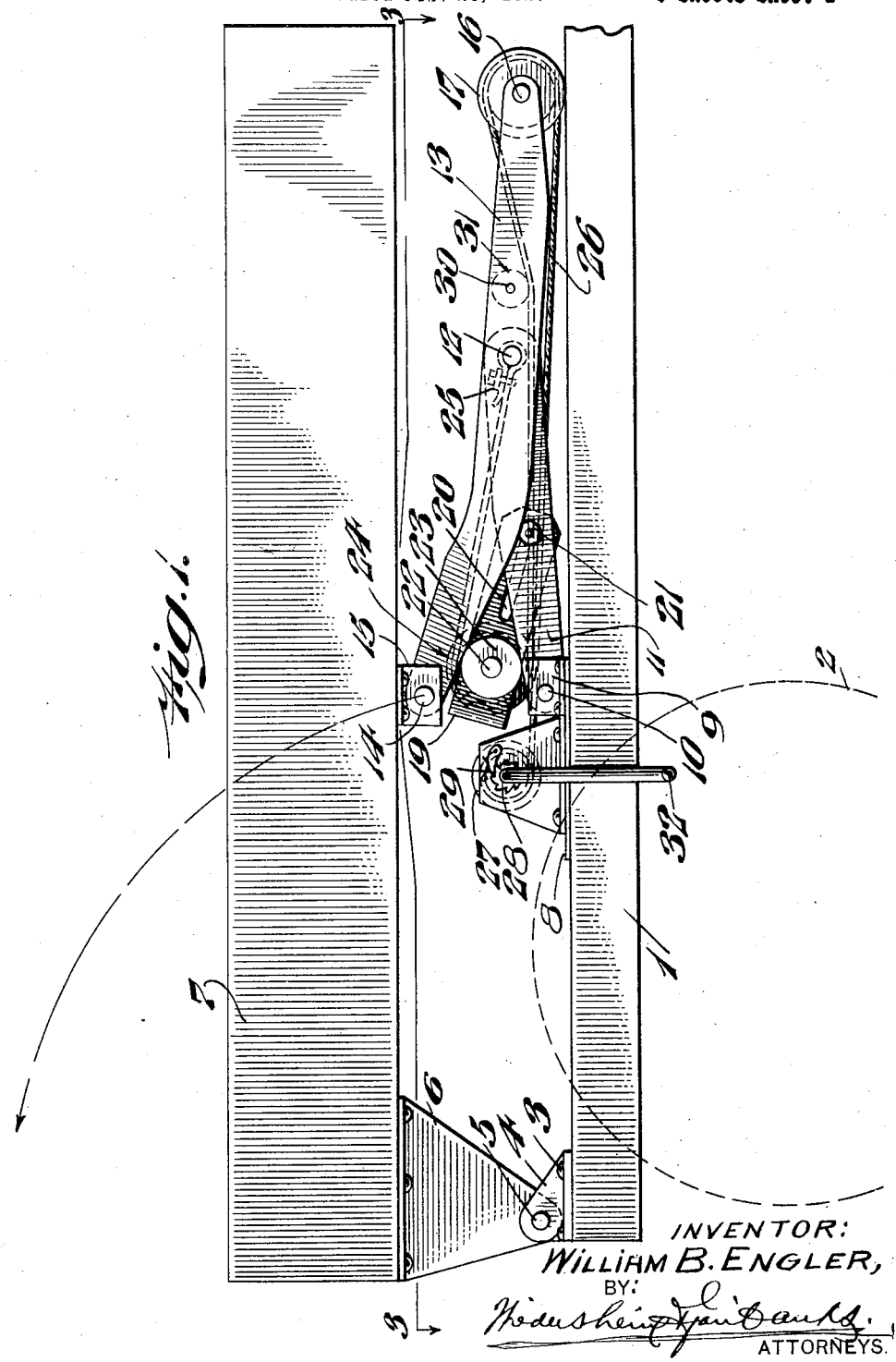
INVENTOR:
WILLIAM B. ENGLER,
BY:
ATTORNEYS.

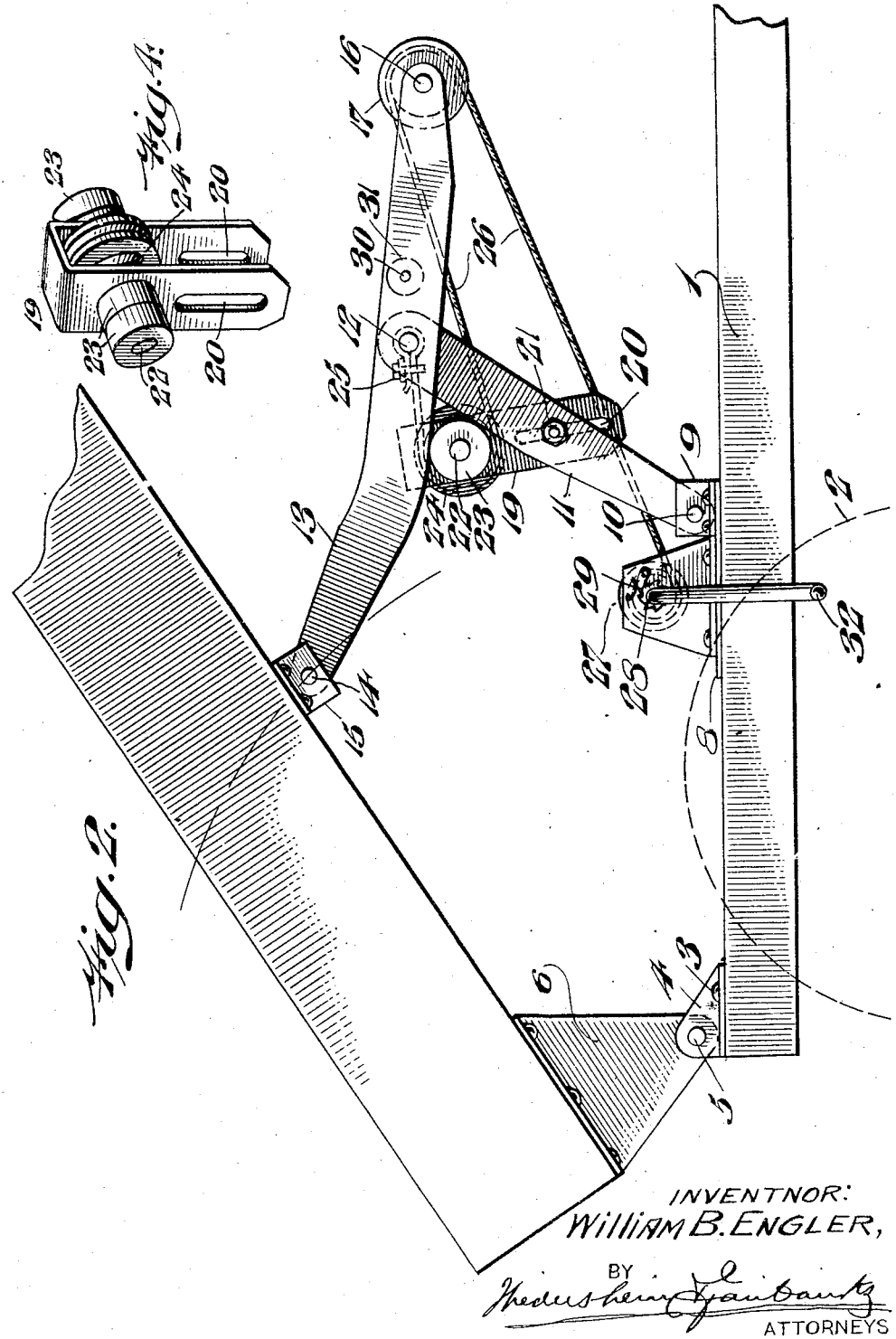

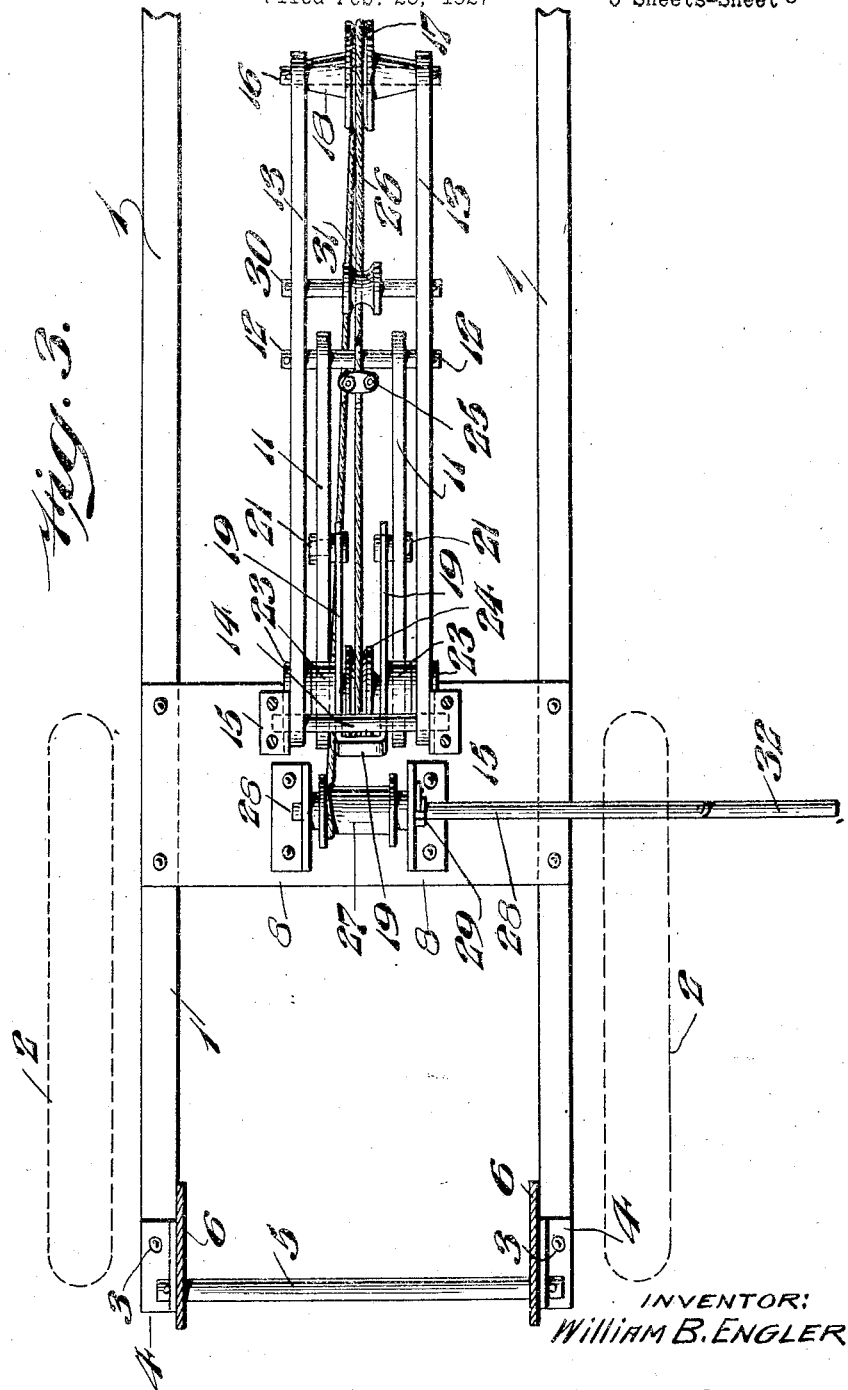

Patented July 19, 1927.

1,636,555

UNITED STATES PATENT OFFICE.

WILLIAM B. ENGLER, OF WATERLOO, NEW YORK.

HOISTING DEVICE FOR VEHICLE BODIES.

Application filed February 26, 1927. Serial No. 171,101.

This invention, generally stated, relates to a novel hoisting device and has more especial relation to a novel hoisting device used in conjunction with a vehicle body, particularly of the motor truck type.

The leading object of the present invention may be said to reside in a hoisting device of the character stated in which is incorporated simplicity of design, cheapness of construction, and efficiency of operation and in which the vertical over-all dimension of the hoisting device is maintained as small as possible.

A further object of the present invention is to provide a structure of the character above stated in which separable body and chassis arms are assembled in a novel manner and provided with rollers therebetween carried by a novel yoke and its adjuncts, for positively coacting with the respective lower and upper edges of said arms for separating the same.

It further consists of a novel construction of a yoke and rollers and a sheave carried thereby, for effecting the actuation of the chassis and body arms or levers.

Other and further objects reside in the provision of general details of construction, arrangement and combination of parts for attaining the results sought by the foregoing objects.

The invention consists of the novel construction hereinafter described and finally claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

The nature, characteristic features and scope of the invention will be more fully understood from the following description taken in connection with the accompanying drawings forming part hereof, and in which:

Fig. 1 represents a view in side elevation of a motor truck chassis equipped with a hoisting device embodying the invention.

Fig. 2 represents a view in side elevation showing the truck body in hoisted position.

Fig. 3 represents a top or plan view on line 3—3 of Fig. 1.

Fig. 4 represents in perspective a detached view of the yoke employed and its adjuncts.

Referring to the drawings in detail, 1 designates the side rails of a truck or vehicle chassis and 2 designates the rear wheels thereof. Fixed to the rear of each chassis rail 1 as by rivets, bolts or the like 3 is a bracket 4 having bearings, in which bearings is rotatably mounted a horizontally disposed shaft or body hinge 5. The shaft 5 passes through a pair of oppositely disposed angular plates 6, which are attached to and support a truck body 7, so that the latter is pivotally mounted with respect to the chassis rails 1, as is clearly shown in Fig. 2.

A description will now be given of the means for tilting the body 7 with respect to the chassis rails 1. Fixed to the chassis rails 1 is a transverse base plate 8. Fixed to this horizontally disposed plate 8 which straddles the chassis rails 1 are brackets 9 spaced apart, as clearly shown in Figs. 1 and 2, and in which brackets is rotatably supported a horizontal shaft 10. Carried by and fixed to this shaft 10 are a pair of inner chassis arms or lever arms 11, through the outer ends of each of which passes a horizontally arranged hinge-pin 12. The outer ends of the hinge-pin 12 pass through a pair of arms 13 whose rear ends are pivotally secured by the hinge-pin 14 to brackets 15 fixed to the underside of the truck body 7. The front or right hand end of each arm has therein a horizontally disposed shaft 16 mounted upon which is a roller or sheave 17, said roller being provided with opposed bearings 18 which rotate freely on said shaft 16, the function of the roller or sheave 17, being hereafter explained. Carried by the arms 11 is a U-shaped member or yoke 19, each arm of which is slotted as at 20 and has adjustable relation with the arms 11 by means of bolt or stud connections 21, said bolts or studs passing loosely through the slots 20. The yoke 19 carries a shaft 22 upon the ends of which are mounted pairs of opposed freely rotatable rollers 23, upon which rollers 23 in the movement of the body 7 the bottom edges of the arms 11 frictionally engage. Carried by the shaft 22 and interposed between the rollers 23 is a sheave 24, as clearly shown in Fig. 3. Having fixed relation with respect to the hinge-pin 12 or other desired attachment near the ends of arms 11 as by the pin 25 is one end of a cable 26, which passes rearwardly around sheave 24, thence forwardly around sheave 17, and thence rearwardly around a drum 27, as clearly shown in Fig. 3, which drum is mounted upon an operating shaft 28 provided with pawl and ratchet mechanism 29 to prevent retrograde movement of the parts during a hoisting period. Carried by the arms 13 is a transversely disposed shaft 30 upon which is mounted a sheave 31. The purpose of this sheave or roller 31 is to guide the cable 26 during a hoisting period, the cable 26 normally being engaged by the roller or sheave 31, as is clearly shown in Fig. 1. The shaft 28 of the drum or winch 27 is provided with a handle 32 for manual operation in the hoisting of the body 7, but it is obvious that said shaft 28 may be operatively connected with any conventional power mechanism of a motor truck for the hoisting operation of body 7, and any other form of winch may be employed.

In operation the rollers 23 mounted as they are upon the ends of the shaft 22 will so bear against the bottom edges of the arms 13 and top edges of arms 11, that when by means of the winch a pull is exerted on the cable 26 or the latter is shortened, said rollers 23 bearing against the underside of arms 13 and top edges of arms 11 will be forced towards pin 12 and cause said arms 11 and 13 to separate at their free ends, as clearly shown in Fig. 2, thus elevating the truck body 7, the yoke 19 moving from the position seen in Fig. 1 into the position seen in Fig. 2. As this movement continues, the movement of the rollers 23 and the sheave 24 therebetween is altered for a given speed of cable, and as this movement becomes slower, the movement of sheave 17 is accelerated, so that for a given force exerted at the winch 27 the lifting and hoisting force at the hinge-pin or pivot points 14 becomes substantially constant. As the cable is shortened it will be apparent that the arms 11 and 13 will be forced apart at their free ends carrying pins 10 and 14, and since the pin 10 is fixed with respect to the chassis it will be clear that pin 14 will be forced upwardly and backwardly, its movement being controlled by the body hinge 5, so that the parts will assume the position seen in Fig. 2.

It will be understood that the chassis arms 11 and the body arms 13 with their coacting rollers 23 can be used singly or in multiple of any number of pairs, two of each unit being shown herein. Especial attention is directed to the novel collocation and assembly of the chassis arms 11 and the longer body arms 13 in conjunction with the rollers 23, yoke 19, sheave 24 and their adjuncts, since by this construction an effective and powerful hoisting mechanism is provided which will actuate the loaded body 7.

It is to be noted that a separate roller 23 is provided for each body arm 13 and chassis arm 11 and that they serve as anti-friction mediums in forcing the free ends of arms 11 and 13 apart in raising body 7, the adjacent rollers turning in opposite directions.

While in the description reference has been made to the front and rear of the body lifting device, obviously the device may be reversed end for end to attain the same result. In other words, the device functions to lift the body and the precise or exact path it will follow is determined by the hinge-point of the body.

Having thus described my invention, what I claim as new and desire to secure by Letters Patent is:

1. In an apparatus of the character stated, a chassis, a body pivotally mounted thereon, spaced pairs of body arms pivoted to said body, spaced pairs of chassis arms pivoted to said chassis and to said body arms, a slidably supported U-shaped yoke, said yoke being provided with opposed end rollers for engaging simultaneously the undersides and the uppersides of said body and chassis arms, a sheave carried by said yoke, a sheave at the forward ends of said body arms, a winch, and a cable operatively interposed between said winch, and sheaves for raising said body about its pivot point.

2. The combination of a body, a chassis, body arms pivoted to said body, a sheave mounted in the ends of said body arms, chassis arms having one of their ends pivoted to said chassis and their other ends in pivotal connection with said body arms, the latter being longer than said chassis arms, a U-shaped yoke having its arms slotted and slidably supported, a shaft passing through the yoke arms and carrying rollers on its ends adapted to contact with and actuate the juxtaposed edges of said body arms and chassis arms, a sheave mounted on said yoke shaft between said rollers, a cable passing over said sheaves, and means for actuating said cable.

3. In an apparatus of the character stated, a chassis, a body pivotally mounted on the rear thereof, spaced pairs of body arms pivoted to said body, spaced pairs of shorter chassis arms pivoted to said chassis and to said body arms, a U-shaped yoke slidably carried by said chassis arms, said yoke carrying opposed end rollers for engaging simultaneously the bottoms and tops of said body and chassis arms, a sheave carried by said yoke, a sheave at the forward ends of said body arms, a winch, and a cable operatively interposed between said winch, and sheaves for raising said body about its pivot point, said cable having one end attached adjacent the pivotal connection between said arms, and the other end to said winch.

4. The combination of a body, a chassis, body arms pivoted at their rear ends to said body, a sheave mounted in the front ends of said body arms, chassis arms having their rear ends pivoted to said chassis and their front ends in pivotal connection with said body arms, the latter being longer than said chassis arms, a centrally disposed U-shaped yoke having its arms slotted and slidably carried by said chassis arms, a shaft passing through the yoke arms and carrying rollers on its ends adapted to contact with and actuate the juxtaposed edges of said body arms and chassis arms, a sheave mounted on said yoke shaft between said rollers, a winch carried on said chassis, a cable passing over said sheaves and having one end secured to said winch and the other end adjacent the pivotal connection between said body arms and chassis arms.

5. In an apparatus of the character stated, a chassis, a body pivotally mounted thereon, spaced pairs of body arms pivoted to said body, spaced pairs of chassis arms pivoted to said chassis and to said body arms, an inverted U-shaped yoke having a slot in each arm thereof slidably carried by said chassis arms, bolts secured to said chassis arms for co-operating with said slots, said yoke being provided with opposed end rollers for engaging simultaneously the undersides and the uppersides of said body and chassis arms, a sheave carried by said yoke, a sheave at the forward ends of said body arms, a winch, and a cable operatively interposed between said winch, and sheaves for raising said body about its pivot point.

6. In an apparatus of the character stated, a chassis, a body pivotally mounted thereon, spaced pairs of body arms pivoted to said body, spaced pairs of chassis arms pivoted to said chassis and to said body arms, a U-shaped yoke slidably carried by said chassis arms, said yoke being provided with opposed end rollers, said rollers each being of two-part construction, one set of roller parts being arranged to engage the undersides of said body arms, and the other set of roller parts being arranged to engage the uppersides of the chassis arms, a sheave carried by said yoke, a sheave at the forward ends of said body arms, a winch, and a cable operatively interposed between said winch, and sheaves for raising said body about its pivot point.

WILLIAM B. ENGLER.